United States Patent [19]

Belove et al.

[11] Patent Number: 5,644,718

[45] Date of Patent: Jul. 1, 1997

[54] APPARATUS USING CIRCUIT MANAGER TO ASSOCIATE A SINGLE CIRCUIT WITH EACH HOST APPLICATION WHERE THE CIRCUIT IS SHARED BY A PLURALITY OF CLIENT APPLICATIONS

[75] Inventors: Edward Belove, Cambridge; R. Patrick Johnson, Manchester; O. Stevens Leland, III, Hudson; Deborah Méndez, Malden; Stephen Zagieboylo, Norfolk, all of Mass.

[73] Assignee: AT&T Corporation, Basking Ridge, N.J.

[21] Appl. No.: 337,950

[22] Filed: Nov. 10, 1994

[51] Int. Cl.⁶ .................................................. G06F 13/00
[52] U.S. Cl. ........................... 395/200.12; 395/200.03; 395/200.09
[58] Field of Search ................................. 395/200, 161, 395/650, 725, 200.09, 600, 800; 340/827; 370/94.1; 364/200, 900; 348/14; 379/269

[56] References Cited

U.S. PATENT DOCUMENTS

| | | | |
|---|---|---|---|
| 4,494,194 | 1/1985 | Harris et al. | 364/200 |
| 4,851,988 | 7/1989 | Trottier et al. | 364/200 |
| 4,866,664 | 9/1989 | Burkhardt, Jr. et al. | 364/900 |
| 5,007,080 | 4/1991 | MacMillan et al. | 379/269 |
| 5,095,480 | 3/1992 | Fenner | 370/94.1 |
| 5,142,683 | 8/1992 | Burkhardt, Jr. et al. | 395/725 |
| 5,218,697 | 6/1993 | Chung | 395/650 |
| 5,222,242 | 6/1993 | Choi et al. | 395/800 |
| 5,230,048 | 7/1993 | Moy | 395/600 |
| 5,287,537 | 2/1994 | Newmark et al. | 395/800 |
| 5,301,270 | 4/1994 | Steinberg et al. | 395/161 |
| 5,303,042 | 4/1994 | Lewis et al. | 348/14 |
| 5,371,852 | 12/1994 | Attanasio et al. | 395/200 |
| 5,423,002 | 6/1995 | Hart | 395/200 |
| 5,426,427 | 6/1995 | Chinnock et al. | 340/827 |
| 5,442,749 | 8/1995 | Northcutt et al. | 395/200.09 |

*Primary Examiner*—Thomas C. Lee
*Assistant Examiner*—Duo Chen
*Attorney, Agent, or Firm*—Cesari and McKenna

[57] ABSTRACT

A computer architecture that permits applications resident on remote "client" computers to communicate simply and efficiently with applications resident on a central server is disclosed. Client applications can effectively retrieve information from the server without detailed knowledge of server applications, the location of a requested data item or the particular hardware configuration of the host or even the client. A circuit manager module opens and maintains a communication circuit to the appropriate server application, supervising routing of messages from all client applications to that server application. The circuit manager also receives all incoming messages, routing them to the appropriate client applications. A client application can specify message destination in the form of a specific circuit (which requires substantial program awareness of communication patterns), or an identifier associated with the target application, or the type of information being requested from the server.

27 Claims, 3 Drawing Sheets

APPARATUS USING CIRCUIT MANAGER TO ASSOCIATE A SINGLE CIRCUIT WITH EACH HOST APPLICATION WHERE THE CIRCUIT IS SHARED BY A PLURALITY OF CLIENT APPLICATIONS

FIELD OF THE INVENTION

This invention relates to client/server computational architectures, and in particular to methods and apparatus for simplifying data interchange and identification in an interactive, multi-user distributed environment.

BACKGROUND OF THE INVENTION

Online computer services are large regional or national networks accessible to consumers by subscription. Providers offer their subscribers a wide range of services, including on-demand access to electronically represented newspapers, software and documents that can be "downloaded" at the user's request; discussion groups in which subscribers can take part by computer; electronic mail among subscribers and non-subscribers; and various forms of entertainment. Generally, consumers connect to a service via telephone, and the service charges its subscribers a recurring fee for its basic service package and a variable fee for the time they are actually connected.

Online services have experienced an enormous increase in their customer bases in the last few years, owing both to the proliferation and growing sophistication of personal computers as well as to the expansion of available services. The need to provide a large, widely dispersed user group with on-demand access to the central online service requires substantial computational capability. The service must not only control and monitor user access, but must also maintain a large, constantly growing reservoir of information to which many users must have simultaneous access.

One widely accepted computer architecture, developed specifically to accommodate the "distributed computing" environments that characterize online services, is the client-server model. In its purest form, a client-server system consists of a central server (sometimes called the host), which is a very powerful computer (or cluster of computers that behaves as a single computer) that services the requests of a large number of smaller computers, or clients, that connect to it. The client computers never communicate with one another, instead exchanging data only with the server, which thereby acts a clearinghouse for client requests and inter-client communications. A server, therefore, may be a large mainframe or minicomputer cluster, while the clients may be simple personal computers.

Although they need not be powerful, it is nonetheless important that clients possess a basic level of on-board processing capability; unlike older timeshare systems, which utilized "dumb" terminals that were essentially driven by the central machine, the client-server model requires that each client be capable of independent computational operation. In this way, the central server need only accept and deliver messages to the clients, which process them for output to the user. This approach limits the processing burden on the server and facilitates faster, readily customized responses by the clients.

An exemplary client-server configuration is illustrated in FIG. 1. A central server 10 communicates with a series of client computers $12_1, 12_2, 12_3, 12_4 \ldots 12_n$ over a coextensive series of physical connections $14_1, 14_2, 14_3, 14_4 \ldots 14_n$. The terms "server" and "host" are herein used interchangeably to denote a central facility consisting of a single computer or group of computers that behave as a single unit with respect to the clients. In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across telephone lines, and have been adopted not only by online services but throughout the worldwide, integrated network communication web known as the Internet.

The Internet contains vast stores of technical and academic information, but much of this is formatted as undifferentiated text, and requires mastery of a difficult command vocabulary to access effectively. The information provided by online services, in contrast, is readily accessible without special training, tailored in content to the interests of subscribers, and presented in a visually appealing fashion. Online services typically offer their subscribers access to the Internet as well, once again in a format designed to promote easier identification and retrieval of information.

In order to support user-friendly interfaces and immediate data access (which require substantial computational resources) while avoiding an excessive processing burden on the central server, online services typically locate some applications on the clients themselves; the applications executed by the server can then be confined primarily to data management and transfer. In this sense, the term "application" denotes a body of functionality for obtaining, processing and/or presenting data to a user. For example, electronic mail (e-mail) facilities allow the user to send and receive memo-type communications; document browsers display hierarchically organized collections of document titles, any of which can be obtained by a user simply by "clicking" on a title with a position-sensing mouse device or otherwise designating the document. Applications can be "active," operating only when affirmatively engaged by a user, or maintain a "background" task mode, which operates even when the application is not active. Furthermore, most current personal computers permit the user to operate more than one active application at a given time; the interface for each typically appears in an isolated rectangular portion of the screen called a "window." Thus, for example, a user might have a document browser and a viewer displaying the contents of a selected article each running as an active application in a separate window; and also a background task continuously checking for the arrival of new e-mail.

Rational allocation of computational responsibility among clients and the server provides obvious efficiency benefits. Freed to obtain and transfer data rather than process it for visual appeal, the central server can access a very large database with far greater speed; and clients can orchestrate on-screen presentation far more efficiently than a remote server can transmit detailed display instructions. This arrangement is also desirable from a business perspective, since it permits third-party developers to create client software that users can purchase if they so choose; the availability of such software increases the appeal of the online service at no cost to the service provider.

Separation of function is not without its complications, however. The more data-processing responsibility that is shifted to the clients, the more computational actors, each with its own address, identity, and suite of active applications, appear on the network stage. Every client, for example, is capable of running multiple applications each of which communicate with corresponding data-handling applications on the central server. Communcations between client and server machines occur over physical TCP/IP connections, while communications among individual client and server applications occur over "circuits," or logical connections; a single physical connection can support numerous multiplexed logical connections. The accurate directing of messages among numerous, simultaneously active client and server applications represents a prodigious task. The degree of difficulty associated with proper maintenance of inter-application communication is sometimes expressed in terms of resource cost. There is a computational cost associated with initiating a circuit, a cost to finding the proper application to service a particular request, a cost to terminating a circuit, and a cost to maintaining a logical connection that is unused.

Furthermore, distribution of functionality ordinarily means that the client software must "know" a great deal about the server applications with which it communicates. Those few current online service systems that support multiple logical conncections ordinarily require each client application to maintain its own set of connections to the host applications with which they may communicate. This approach effectively ignores the costs discussed above (since connections are maintained whether they are used or not), accepting inefficiency as the price of multiple communication channels; and increases the programming costs associated with client applications (since they must be able to target and interact with specific server applications), discouraging third-party development.

Because server applications are largely or even entirely dedicated to the location, retrieval and transmission of information, they must communicate not only with client applications but also with large, host-based databases. These contain data that differ in type, mode of generation and ultimate use. To maintain application flexibility and accommodate rapid database expansions, online services usually divide data into separate databases accessible, as appropriate, to the various host applications (each of which typically manages a particular type of data). Naturally, it is desirable to isolate client applications from the details of host and database organization (which may be complex and change frequently), and to allow information requests from clients to specify the desired data with the least feasible amount of precision. Accordingly, it is generally preferred not to require the client application to maintain awareness of the storage locations of requested items.

One accepted alternative is for the host to maintain a separate master locator database that a client application queries to determine the location of a stored information item. This creates a communication bottleneck, since every client must access the master database each time it makes a request. Another approach is to establish a clearinghouse structure on the server, which dispatches requests to appropriate applications based on the type of data being requested. This, however, merely substitutes one form of bottleneck for another (and ordinarily relies, ultimately, on some form of master locator database).

SUMMARY OF THE INVENTION

The present invention provides an architecture that permits client applications to issue generic requests for communication with server-based applications in the absence of detailed knowledge of that application, the location of a requested data item or, indeed, the particular hardware configuration of the host or even the client. In one important aspect, the invention relieves authors of client applications from the need to endow their programs with connection-management capabilities; instead, applications need only request communication services, specifying a destination for outgoing messages. A circuit manager module opens and maintains the appropriate circuit, supervising routing of messages from this and all other client applications to the proper server applications. The circuit manager also receives all incoming messages, routing them to the appropriate client applications.

The invention accomplishes the foregoing by applying the logic of encoded messages to incoming and outgoing messages, and utilizing the encoding to facilitate routing. However, unlike conventional TCP/IP-encodings, which require highly explicit destination information, the invention tolerates a range of specifiers to maintain flexibility at the application level. Thus, a client application can specify message destination in the form of a specific circuit (which requires substantial program awareness of communication patterns), or an identifier associated with the target application, or the type of information being requested from the server.

To accommodate the demands of multiple clients seeking access to a particular circuit, the circuit keepers maintain command stacks, called operations queues, that accumulate instructions passed by client applications. The invention also recognizes the need of certain client applications to obtain information directly from the communication channel by providing facilities, called "waiters," that can effectively bypass the usual routing procedures applied to incoming information. By requesting creation of a waiter, a client application ensures that each message received over the associated circuit will be individually inspected according to stated criteria, and that the application will be notified when a message satisfying the criteria is received.

The foregoing elements of the invention, by establishing circuits between the client and specific server applications and requiring server-originated messages to contain routing information or be handled by a waiter, effectively makes all messages self-directing. In a second aspect of the invention, this capability is enhanced by dividing server databases into categories relevant to client applications. This simplifies the information that client-originated messages must provide in order to obtain a desired data item; as noted above, the invention is configured to locate database records based on no more than a category identifier.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENT

Figure 1:
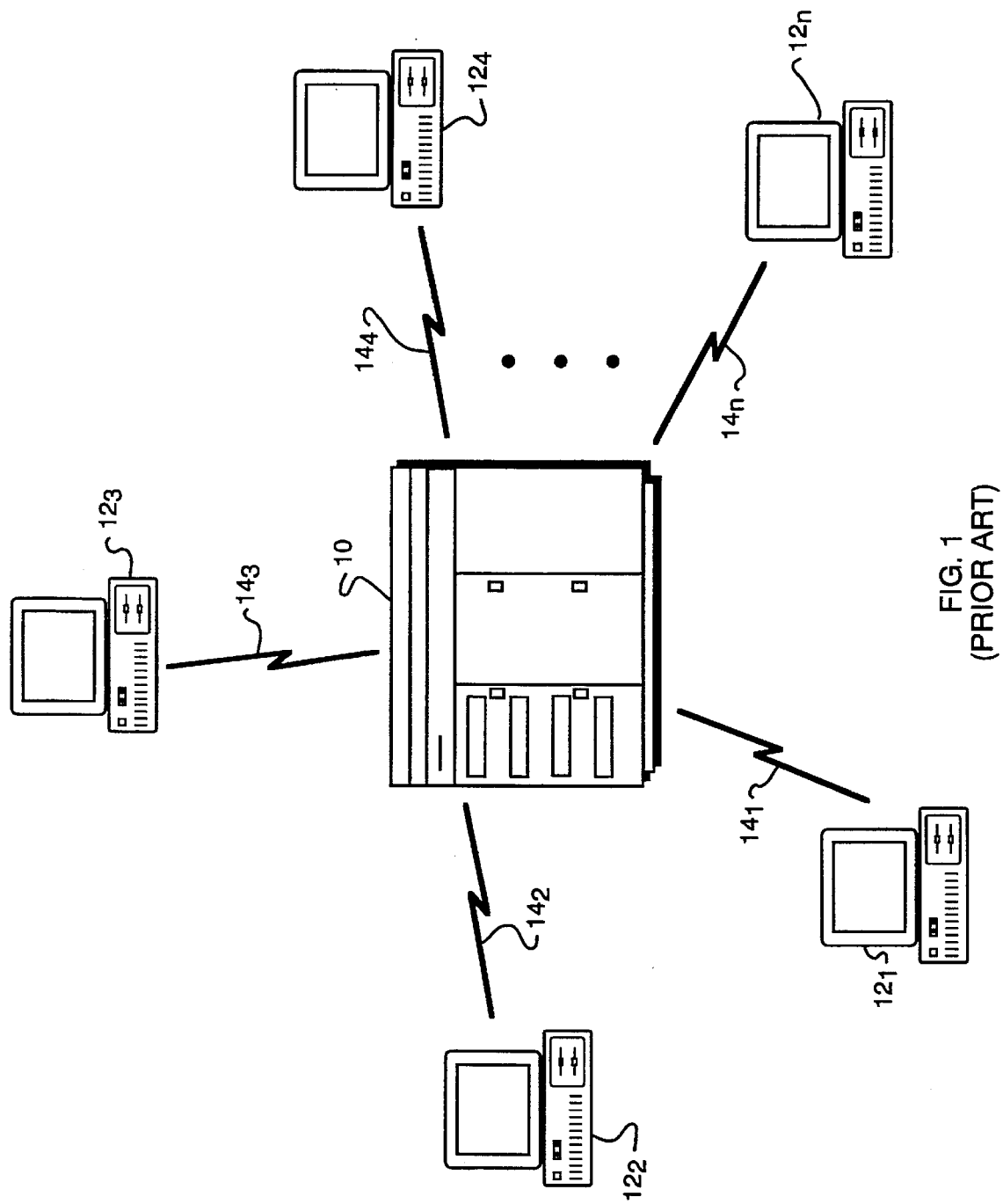
FIG. 1 schematically illustrates a simplified client-server arrangement.
Figure 2:
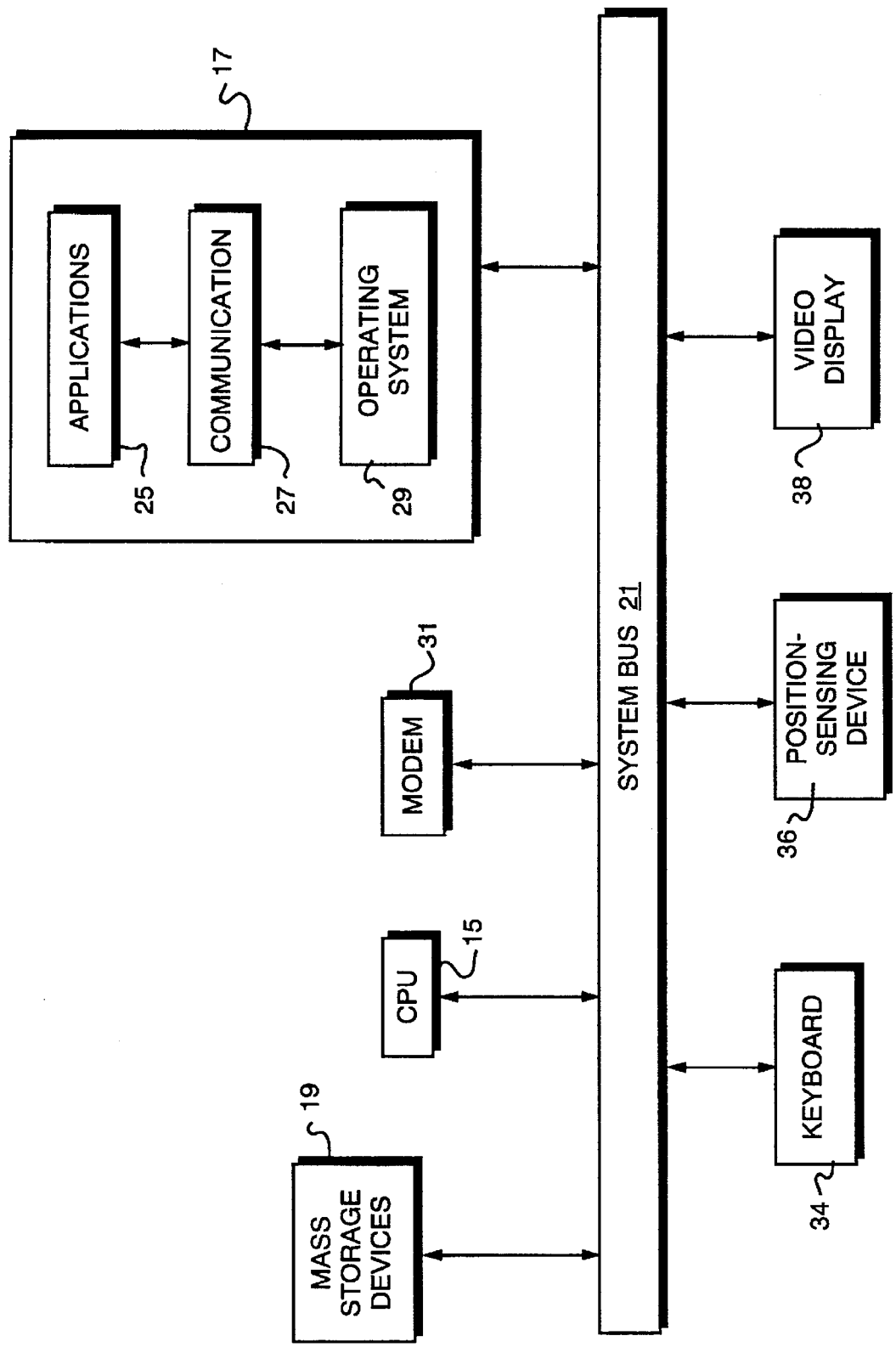
FIG. 2 schematically illustrates the components and operation of a computer system serving either as host or client.

Refer first to FIG. 2, which illustrates generic computer circuitry representative both of clients and servers. The depicted computer system includes a central-processing unit 15, which performs operations on and interacts with a main system memory 17 and components thereof. System memory 17 typically includes volatile or random-access memory (RAM) for temporary storage of information, buffers, and portions of the computer's basic operating system. The system also includes at least one mass storage device 19, such as a hard disk and/or CD-ROM drive. All components of the system communicate over a bidirectional system bus 21.

While clients and servers bear similar hardware configurations at this level of generality, their relative processing and data-storage capabilities are naturally quite different. A client may be, for example, a personal computer running the Windows graphical user interface supplied by Microsoft Corp., while the server is ordinarily some type of mainframe or minicomputer cluster running several multi-platter hard drives and/or optical storage components as mass storage device 19.

System memory 17 contains, during operation, a series of applications 25 appropriate to the role the computer 10 is to play in the client-server system, a communication module 27 (preferably implementing TCP/IP) capable of transferring data among machines, and an operating system or graphical user interface 29. Communication module 27 drives a modem 31 or other data-transmission circuitry to transfer streams of digitally encoded data over telephone or other communication lines.

The user interacts with the system using a keyboard 34 and a position-sensing device (e.g., a mouse). The output of either device can be employed to designate information or select particular areas of a video screen display 38, over which the user observes the state of the system or, in the case of a subscriber, views requested information. Ordinarily, interactions between the user and applications 25 are managed through a suitable graphical user interface appearing on display 34.

In operation, a subscriber uses a computer as described above to communicate and interact with the server. The subscriber's connection to the host is established and maintained by a dedicated one of the applications 25, which sends and receives messages via the physical connection to the server sustained by communication module 27. The client effectively runs its own set of applications 25 as well as those on the server with which it interacts through message exchange.

Most frequently, the user's interactions reduce to requests for data stored on one of the server's databases. In the context of the present invention, data is represented as information units referred to as "items." An item is the smallest independent unit of information. Items may or may not be represented by contiguously stored electronic data, and may not even reside on a single database; the server runs sophisticated database maintenance and access applications 25 to assemble an item (e.g., an article containing related text and image data) from its constituent components and transfers the item so that the user receives it as a single unit. (Because, in the context of the present invention, the communication protocol is preferably based on TCP/IP, the item may actually travel from the server as several separate messages that are integrated by the client's communication module 27.)

Figure 3:
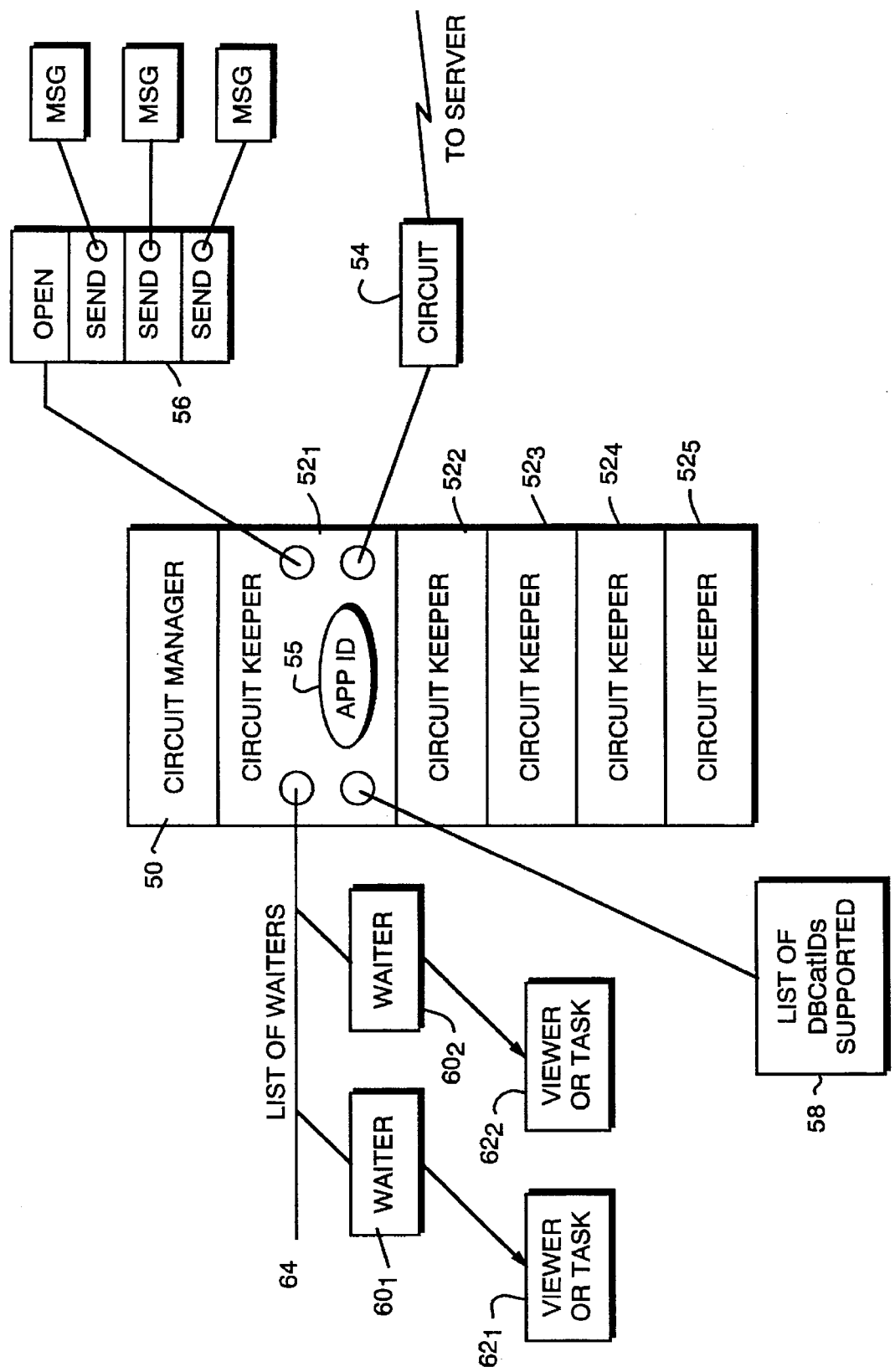
FIG. 3 schematically illustrates a representative implementation of the circuit-management aspect of the present invention.

To implement the features of the present invention, the client computers are provided with a series of specialized modules stored in system memory 17 during operation. These modules, which are illustrated in FIG. 3, mediate between server requests issued by and retrieved items destined for applications 25, and the physical connection to the server sustained by communication module 27. The components of the present invention are accessible to applications 25 and issue commands to communication module 27.

The central component of the present invention is a circuit manager 50, which, in response to commands from applications 25 and various conditions described below, creates and supervises the operation of a series of circuit keepers, representatively depicted at reference numerals $52_1$, $52_2$, $52_3$, $52_4$, $52_5$. Each circuit keeper 52 maintains a circuit 54 between a particular server application, designated by AppID, and the client; the AppID with which the circuit keeper is associated, as well as any other connection information necessary to establish the circuit, is stored in a related memory partition 55. Each circuit keeper is associated with a unique alphanumeric identifier. Circuit manager 50 ensures that each server application communicates with the client computer over a single circuit; multiple client applications, however, may transfer and receive data to and from the server application over this circuit. In this way, the invention obviates the need to maintain separate circuits to each client application communicating with a single server application.

The invention accomplishes this by providing each circuit keeper 52 with an operations queue 56, which is another memory partition associated with the circuit keeper that accumulates pending circuit operation instructions if these reach the circuit keeper faster than they can be executed. The operations specified in the queue can originate with multiple client applications, and are routed to the appropriate circuit keeper 52 by circuit manager 50 as described below. Preferably, the repertoire of supported operations is limited in order to minimize the lexicon of commands that application programs 25 must support to interact with circuit manager 25, and to maintain overall system efficiency.

In the preferred embodiment, the operations supported are: Close (render inactive a previously established circuit); Open (start a new circuit or restore a closed circuit to activity); and Send [Message] (pass an associated message to the server application over the circuit). Thus, as shown in FIG. 3, an operations queue may contain an Open command, followed by three requests to send the messages associated with the Send command. A close command does not destroy the circuit keeper; it merely terminates the circuit. The data specifying the circuit keeper and the server application to which it corresponds remains in system memory so that the circuit keeper can be reactivated (e.g., by the Open command).

Most typically, a client application 25 initially creates a message destined for a particular server application specified in the message by a digitally encoded identifier. In an object-oriented implementation, the application simply creates an instance of the particular message to be sent; the message object contains not only the necessary routing information, but also the instructions necessary to invoke processing by circuit manager 50. Circuit manager 50 then examines the AppIDs associated with each circuit keeper to determine whether a circuit already exists between the client and the specified server application. If not, circuit manager 50 creates a new circuit keeper. Once again, in an object-oriented system, this is straightforwardly accomplished by encapsulating the circuit keepers (that is, the member functions performed by circuit keepers as herein described) as objects, and creating instances of circuit-keeper objects as necessary; techniques for defining functions as replicable objects with heritable traits are well-known by those skilled in the art. Circuit manager 50 then establishes the circuit in a conventional manner (via the communication module 27), and electronically stores the AppID of the server application in memory partition 55.

If a circuit already exists, or after circuit manager establishes one, messages originated by the various client applications are provided to circuit manager 50 for transmission by the appropriate circuit keeper. Again to promote broad, easily implemented compatibility with application programs 25, circuit manager has associated therewith a routing capability that analyzes messages to determine the proper circuit even if this is not explicitly specified in a message. In particular, each message contains a digital signature that designates (a) a specific circuit, (b) a specific server application (designated by AppID), or (c) a database category identifier, or DBCatID. In a request message, the latter term designates the category of database (since the server is likely to contain numerous databases) in which the requested item is stored, as described more fully below. This capability confers substantial flexibility at the application level, since an application need not "know" the server application with which it must communicate, nor even the precise location of the data sought, so long as it can specify the category of database likely to contain it. Moreoever, since circuit selection can occur fully on the client, request-routing bottlenecks that would occur through server involvement are avoided; each of potentially many running clients can make independent routing determinations without simultaneously burdening the server.

Each circuit keeper 52 maintains, in a third memory partition 58, a list or database of DBCatIDs supported by the server application (identified by AppID) of the circuit. In one embodiment, the server provides this list to circuit manager 50, which directs it to circuit keeper 52, upon successful creation of the circuit. Preferably, however, a master mapping database relating server applications to databases and database categories is maintained on the server, and is accessed over a dedicated control circuit only when necessary. Locating the mapping database on the server, and requiring clients to consult this database anew each session, permits frequent reorganization of item databases without the need to report these to the clients. Instead, only the mapping database need be changed, and the alterations will propagate to clients as necessary.

In this implementation, a new circuit keeper 52 is automatically created when an outgoing message designates only a DBCatID that has not yet been used during the current interactive session between the client and the server; the new circuit keeper requests, over the control circuit, the AppID currently associated with the DBCatID. Circuit manager 50 compares this list with the AppIDs in the various memory partitions 55 to determine whether a circuit to an eligible application already exists. If a match is found, circuit manager 50 transfers all operations in the queue of the newly created circuit, and all waiters (described below) associated therewith, to the identified existing circuit; it then destroys the newly created circuit keeper. If no match is found, circuit manager 50 (via communication module 27) establishes a circuit between the client application that generated the message and one of the server applications returned by the mapping database; it then associates this circuit with the newly created circuit keeper.

A representative instruction sequence for implementing the routing function is as follows:

```
CircuitKeeper * the CircuitKeeper = <ask the message object which circuit it
    would like>;
if (theCircuitKeeper == NULL)    //If answer is "I don't know"
{
    ApplicationID theAppID = <ask the message object which server application
        it would like to go to>;
    if (the AppID == NULL)    // If answer is "I don't know"
    {
        DBCatID theDBCatID = <ask the message object which DBCatID it is
            associated with>;
        theCircuitKeeper = <Find the CircuitKeeper supporting this DBCatID>;
        if (theCircuitKeeper == NULL)        /if there isn't one,
            theCircuitKeeper = new CircuitKeeper(theDBCatID); //make one
    }
    else
    {
        theCircuitKeeper = <Find the CircuitKeeper supporting this AppID>;
        if (theCircuitKeeper == NULL)        //if there isn't one,
            theCircuitKeeper = new CircuitKeeper(theAppID) ; //make one
    }
}
<send the router to 'theCircuitKeeper'>
```

Although this architecture greatly simplifies interactions between client and server applications by insulating client applications from the details of circuit management and maintenance, the imposition of a general clearinghouse layer, through which all incoming messages pass before being routed to an application, can interfere with the operation of certain applications that must receive messages and information directly from the connection. For example, some items exhibit special replication behaviors that must be managed interactively by client applications; some applications require immediate status notification from the server that cannot await the usual routing procedures; and some messages will not contain routing information adequate to ensure delivery to the appropriate client application.

The invention therefore provides a facility, called a "waiter," that permits a client application to bypass the routing function altogether. A waiter module inspects each message received by the circuit keeper, evaluating them against specified criteria. When a message satisfying the comparison criteria is received, the waiter issues a notification signal to the client application (or sets a flag in a data structure accessible to the client application) with which it is associated. Typical comparison criteria include message type; a specific item identifier named in the message; and a specific message "selector." The latter is a two-byte stamp that client applications put on all data requests, and which the server copies into its response.

Each waiter, indicated representatively by numerals $60_1$, $60_2$, is associated with a single client application $62_1$, $62_2$ and is associated with a unique alphanumeric identifier. However, a single application can request and have associated with it more than one waiter. Furthermore, multiple waiters can be associated with a single circuit keeper 52. This can reflect the multiple requests of a single client application and/or the fact that one circuit keeper can service multiple client applications. Accordingly, each circuit keeper 52 maintains a fourth memory partition 64 that lists identifiers of all waiters associated with the circuit keeper.

On the server side, applications (which by and large are concerned with item location, retrieval and transmission) receive messages from and generate messages destined for particular client applications. In order to simplify the creation and maintenance of server applications, as well as to facilitate database expansion, it has been found desirable to allow for subdividing of databases into categories (each denoted by a DBCatID as noted above). Preferably, database categories represent collections of data segregated along boundaries relevant to client applications. In this way, each database can contain a single class of data (simplifying the structure of server applications) but fall within a hierarchical database category that is meaningful to client applications.

Replies from the server ordinarily proceed over an already-established circuit. However, circuit manager 50 can, if desired, be configured to accept incoming messages over the control circuit and to analyze a signature, associated with an incoming message, that identifies the particular client application for which the message is intended. The circuit manager can then open a circuit between the server application and the client application specified in the signature in the manner discussed above.

It will therefore be seen that the foregoing represents a highly versatile and flexible approach to communication between client and server applications, and management of circuits therebetween. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. Apparatus for establishing and managing communication circuits between one of a plurality of client computers and a central host computer, the client being capable of (i) interacting with a plurality of host applications resident and active on the host and (ii) running a plurality of client applications resident and active on the client, the apparatus comprising:
   a. a communication platform for establishing and maintaining communication circuits between the client and the host, the platform itself comprising means for sending digitally encoded outgoing messages to the host and for receiving digitally encoded incoming messages from the host;
   b. a circuit manager for associating a single circuit with each host application active with respect to the client, the circuit capable of being shared by a plurality of client applications; and
   c. routing means for decoding digital signatures associated with outgoing messages by client applications and, based thereon, routing the messages to host applications over the circuits associated therewith.

2. The apparatus of claim 1 further comprising a circuit keeper for each circuit, each circuit keeper comprising:
   a. a computer memory, accessible to the routing means, for storing an identifier corresponding to the host application associated with the circuit; and
   b. an operations queue for accumulating, from client applications, instructions specifying the circuit and requesting communication by the communication platform.

3. The apparatus of claim 2 wherein the computer memory further stores a list of host databases accessible to the host application.

4. The apparatus of claim 2 wherein the signatures specify a circuit in the form of a unique identifier associated therewith, and the routing means utilizes the identifier to locate the selected circuit.

5. The apparatus of claim 3 wherein the signatures specify a circuit in the form of an identity of a host database, and the routing means utilizes the database identity to locate the selected circuit.

6. The apparatus of claim 5 further comprising a mapping database relating host databases to host applications, and wherein the routing means utilizes the database identity to locate the selected circuit by inspection of the mapping database.

7. The apparatus of claim 6 wherein the mapping database is located on the host and is accessed by the routing means over a control circuit.

8. The apparatus of claim 6 wherein the circuit manager determines whether the host application specified by the mapping database is already associated with a circuit keeper and, if so:
   a. adding the identity of the host database to the computer memory associated with said circuit keeper; and
   b. designating the circuit associated with said circuit keeper as the selected circuit.

9. The apparatus of claim 2 wherein the instructions include commands to open a circuit, to close a circuit and to send a message over an open circuit.

10. The apparatus of claim 1 wherein:
    a. the circuit manager receives incoming messages and passes them to the routing means; and
    b. the routing means decodes signatures associated with the incoming messages and, based thereon, routes the messages to circuits associated with client applications.

11. The apparatus of claim 10 wherein the circuit manager further comprises means for opening a circuit between a host application and a client application specified in the signature of an incoming message from the host application.

12. The apparatus of claim 10 further comprising means for establishing, in response to a command issued by the client application, a waiting module, the waiting module comprising:
    a. analysis means, associated with the communication platform, for analyzing each incoming message according to predetermined criteria; and
    b. means for notifying the client application when a received message satisfies the criteria.

13. The apparatus of claim 10 wherein an outgoing message contains a request for an item of data and a specification of the location of the requested data, the specification comprising a database category identifier and a record location.

14. The apparatus of claim 13 wherein the specification further comprises a database identifier.

15. The apparatus of claim 1 wherein the circuit manager and the routing means are located on the at least one client and not on the server.

16. The apparatus of claim 15 wherein each circuit keeper is located on a client and not on the server.

17. A method of managing communications between one of a plurality of client computers and a central host computer, the client being capable of (i) interacting with a plurality of host applications resident and active on the host and (ii) running a plurality of client applications resident and active on the client, the method comprising the steps of:
 a. establishing a single communication circuit between the client and each host application active with respect to the client, the circuit capable of being shared by a plurality of client applications;
 b. accepting outgoing messages from client applications;
 c. analyzing the accepted messages for a digital signature indicative of a host application active with respect to the client; and
 d. routing the message to the indicated host application over the single circuit associated therewith.

18. The method of claim 17 further comprising the step of opening a circuit in response to a request from a client application.

19. The method of claim 17 further comprising the step of maintaining an operations queue for accumulating, from client applications, communication instructions specifying the circuit.

20. The method of claim 17 wherein the signatures indicate a circuit by a unique identifier associated therewith.

21. The method of claim 17 wherein the signatures indicate a circuit by identifying a host database.

22. The method of claim 21 further comprising the steps of:
 a. providing a mapping database relating host databases to host applications; and
 b. locating the selected circuit by inspection of the mapping database.

23. The method of claim 22 further comprising the steps of:
 a. determining whether the host application specified by the mapping database is already associated with a circuit;
 b. if so, routing the message to the associated circuit; and
 c. if not, creating a circuit between the client and the host application, and routing the message to the created circuit.

24. The method of claim 19 wherein the communication instructions include commands to open a circuit, to close a circuit and to send a message over an open circuit.

25. The method of claim 17 further comprising the steps of:
 a. receiving incoming messages from the host, each message containing a digital signature indicative of a client application;
 b. decoding the signatures; and
 c. based thereon, passing the messages to the indicated client applications.

26. The method of claim 25 further comprising the steps of:
 a. determining whether a circuit exists between the host application and the client;
 b. if not, opening such a circuit;
 c. if so, determining whether the circuit is shared by the client application; and
 d. if not, associating the client application with the circuit.

27. The method of claim 25 further comprising the steps of:
 a. upon the request of a client application, analyzing each incoming message according to predetermined criteria; and
 b. notifying the client application when a received message satisfies the criteria.

* * * * *